(12) United States Patent
Ophir et al.

(10) Patent No.: US 11,619,743 B2
(45) Date of Patent: Apr. 4, 2023

(54) SYSTEM AND METHOD FOR GENERATING A THREE-DIMENSIONAL (3D) MAP BASED ON MAPPING DESIGNATION INFORMATION

(71) Applicant: ELBIT SYSTEMS LTD., Haifa (IL)

(72) Inventors: Yoav Ophir, Haifa (IL); Dan Hakim, Haifa (IL); Assaf David, Haifa (IL); Tamir Demri, Haifa (IL)

(73) Assignee: ELBIT SYSTEMS LTD., Haifa (IL)

( * ) Notice: Subject to any disclaimer, the term of this patent is extended or adjusted under 35 U.S.C. 154(b) by 0 days.

(21) Appl. No.: 17/815,573

(22) Filed: Jul. 28, 2022

(65) Prior Publication Data

US 2022/0365220 A1     Nov. 17, 2022

Related U.S. Application Data

(63) Continuation of application No. PCT/IL2021/050034, filed on Jan. 11, 2021.

(30) Foreign Application Priority Data

Feb. 3, 2020   (IL) .......................................... 272450

(51) Int. Cl.
| | | |
|---|---|---|
| *G01C 3/08* | (2006.01) | |
| *G01S 17/894* | (2020.01) | |
| *G01S 13/32* | (2006.01) | |
| *G01S 13/86* | (2006.01) | |

(52) U.S. Cl.
CPC ............ *G01S 17/894* (2020.01); *G01S 13/32* (2013.01); *G01S 13/865* (2013.01)

(58) Field of Classification Search
None
See application file for complete search history.

(56) References Cited

U.S. PATENT DOCUMENTS

| | | |
|---|---|---|
| 9,383,753 B1 | 7/2016 | Templeton et al. |
| 2004/0169663 A1 | 9/2004 | Bernier |

(Continued)

FOREIGN PATENT DOCUMENTS

| | | |
|---|---|---|
| EP | 3516421 A2 | 7/2019 |
| WO | 2018055449 A2 | 3/2018 |

*Primary Examiner* — Mark Hellner (57) ABSTRACT

A system for generating a three-dimensional (3D) map of part of a field-of-view (FOV) of at least one detector of an active 3D scanner, comprising: the active 3D scanner, comprising: a mechanism configured to scan the FOV; at least one energy emitting source configured to emit energy pulses; and the at least one detector; and processing circuitry configured to: obtain information, wherein at least some of designation information is tracker-based designation information that is designated by a user of the system via a tracker that tracks a line-of-sight between the user and the FOV; selectively activate the energy emitting source to emit a subset of the energy pulses, in accordance with the information, including the tracker-based designation information, and in synchronization with the mechanism, to cover the part of the FOV; obtain current readings, from the detector, based on reflections of the subset of the energy pulses; and generate the 3D map based on the current readings.

20 Claims, 3 Drawing Sheets

(56) References Cited

U.S. PATENT DOCUMENTS

| | | |
|---|---|---|
| 2014/0063489 A1* | 3/2014 | Steffey .................. G01C 15/002 |
| | | 356/72 |
| 2017/0269198 A1 | 9/2017 | Hall et al. |
| 2017/0269209 A1 | 9/2017 | Hall et al. |
| 2018/0017680 A1 | 1/2018 | Pennecot et al. |
| 2018/0120424 A1 | 5/2018 | Eshel et al. |
| 2018/0149732 A1 | 5/2018 | Droz et al. |
| 2018/0156896 A1 | 6/2018 | O'Keefe |
| 2018/0284244 A1 | 10/2018 | Russell et al. |
| 2019/0317217 A1 | 10/2019 | Day et al. |
| 2022/0084236 A1* | 3/2022 | Send ....................... G01S 11/12 |

* cited by examiner

SYSTEM AND METHOD FOR GENERATING A THREE-DIMENSIONAL (3D) MAP BASED ON MAPPING DESIGNATION INFORMATION

TECHNICAL FIELD

The invention relates to a system and method for generating a three-dimensional (3D) map based on mapping designation information.

BACKGROUND

An active 3D scanner, such as a Light Detection and Ranging (LiDAR), can be configured to scan a field-of-view (FOV) of at least one detector of the active 3D scanner. In accordance with the scan, a high resolution 3D map of the FOV can be generated.

It would be desirable to generate a 3D map of part of a FOV of the at least one detector of the active 3D scanner that maintains the operational benefits of a high resolution 3D map of all of the FOV while providing additional attendant benefits. This apparently could be achieved by modifying a scanning profile of the active 3D scanner in real-time. However, such a solution is costly, complex and unreliable.

Thus, there is a need in the art for a system and method for generating a 3D map of part of a FOV of at least one detector of an active 3D scanner without modifying a scanning profile of the active 3D scanner in real-time.

References considered to be relevant as background to the presently disclosed subject matter are listed below. Acknowledgement of the references herein is not to be inferred as meaning that these are in any way relevant to the patentability of the presently disclosed subject matter.

U.S. Patent Application Publication No. 2017/0269198 ("Hall et al."), published on Sep. 21, 2017, describes methods and systems for performing three dimensional Light Detection and Ranging (LIDAR) measurements with varying illumination field density. A LIDAR device includes a plurality of pulse illumination sources and corresponding detectors. The current pulses supplied to the pulse illumination sources are varied to reduce total energy consumption and heat generated by the LIDAR system. In some embodiments, the number of active pulse illumination sources is varied based on the orientation of the LIDAR device, the distance between the LIDAR device and an object detected by the LIDAR device, an indication of an operating temperature of the LIDAR device, or a combination thereof. In some embodiments, the number of active pulse illumination sources is varied based on the presence of an object detected by the LIDAR device or another imaging system.

U.S. Patent Application Publication No. 2017/0269209 ("Hall et al."), published on Sep. 21, 2017, describes methods and systems for performing three dimensional LIDAR measurements with different pulse repetition patterns. Each repetitive pattern is a sequence of measurement pulses that repeat over time. In one aspect, the repetition pattern of a pulsed beam of illumination light emitted from a LIDAR system is varied to reduce total energy consumption and heat generated by the LIDAR system. In some examples, the repetitive pattern is varied by skipping a number of pulses. In some examples, the repetitive pattern of pulses of illumination light emitted from the LIDAR system is varied by changing a repetition rate of the sequence of emitted pulses. In some examples, the pulse repetition pattern is varied based on the orientation of the LIDAR device. In some examples, the repetition pattern is varied based on an object detected by the LIDAR device or another imaging system.

U.S. Patent Application Publication No, 2018/0120424 ("Eshel et al."), published on May 3, 2018, provides a LIDAR system. The LIDAR system comprises at least one processor configured to: control at least one light source in a manner enabling light flux to vary over a scan of a field of view, the field of view including a first portion and a second portion; receive on a pixel-by-pixel basis, signals from at least one sensor; estimate noise in at least some of the signals associated with the first portion of the field of view; alter a sensor sensitivity for reflections associated with the first portion of the field of view; estimate noise in at least some of the signals associated with the second portion of the field of view; and alter a sensor sensitivity for reflections associated with the second portion of the field of view based on the estimation of noise in the second portion of the field of view.

U.S. Patent Application Publication No. 2018/0284244 ("Russell et al."), published on Oct. 4, 2018, discloses a controller that identifies a triggering event and provides a control signal to a light source in a lidar system that adjusts the power of light pulses provided by the light pulse, thereby dynamically controlling power in the lidar system. Triggering events may include exceeding a threshold speed, being within a threshold distance of a person or other object, an atmospheric condition, etc. In some scenarios, the power is adjusted to address eye-safety concerns.

GENERAL DESCRIPTION

In accordance with a first aspect of the presently disclosed subject matter, there is provided a system for generating a three-dimensional (3D) map of part of a field-of-view (FOV) of at least one detector of an active 3D scanner, the system comprising: the active 3D scanner, comprising: a scanning mechanism configured to scan the FOV; at least one energy emitting source configured to emit energy pulses, in synchronization with the scanning mechanism, to cover the FOV; and the at least one detector; and processing circuitry configured to: obtain mapping designation information, the mapping designation information activate the at least one energy emitting source to emit only a subset of the energy pulses, in accordance with the mapping designation information and in synchronization with the scanning mechanism, to cover the part of the FOV; obtain current readings, from the at least one detector, based on reflections of the subset of the energy pulses; and generate the 3D map based on the current readings.

In some cases, the mapping designation information includes a designation of the part of the FOV or a second part of the FOV that is not the part of the FOV.

In some cases, the mapping designation information includes a designation of pixel resolutions of the 3D map for one or more regions within the part of the FOV.

In some cases, the mapping designation information includes a designation of energy levels of one or more first energy pulses of the subset of the energy pulses.

In some cases, at least some of the mapping designation information is obtained from a user of the system.

In some cases, the at least some of the mapping designation information is obtained from a tracker that tracks a line-of-sight between the user and a region within the part of the FOV.

In some cases, at least some of the mapping designation information is based on a geolocation of one or more objects within the FOV.

In some cases, the geolocation of at least one of the objects is stored in a geographical database.

In some cases, at least some of the mapping designation information is based on a terrain elevation map.

In some cases, at least some of the mapping designation information is based on a decoded image that includes the part of the FOV.

In some cases, the at least one energy emitting source is selectively activated, at least in part, to conserve energy resources of the system.

In some cases, at least some of the mapping designation information is associated with one or more fixed coordinate areas within the FOV having fixed coordinates in a fixed coordinate system established in space and wherein the processing circuitry is further configured to: upon identifying a change in a position of the at least one detector relative to the fixed coordinate areas, update the at least some of the mapping designation information based on the change.

In some cases, at least some of the mapping designation information is associated with one or more fixed coordinate areas within the FOV having fixed coordinates in a fixed coordinate system established in space and wherein the processing circuitry is further configured to: upon identifying a change in an orientation of the at least one detector relative to the fixed coordinate areas, update the at least some of the mapping designation information based on the change.

In some cases, at least some of the mapping designation information is associated with one or more fixed coordinate areas within the FOV having fixed coordinates in a fixed coordinate system established in space, the active 3D scanner is gimbaled to a platform by a gimbal, and the processing circuitry is further configured to: upon identifying a change in a first orientation of the platform relative to the fixed coordinate areas, provide a control signal for rotating the active 3D scanner along the gimbal to maintain a second orientation of the at least one detector relative to the fixed coordinate areas notwithstanding the change in the first orientation of the platform relative to the fixed coordinate areas.

In some cases, at least some of the mapping designation information is associated with one or more moving objects within the FOV and wherein the processing circuitry is further configured to: upon identifying a change in a position of the at least one detector relative to the moving objects, update the at least some of the mapping designation information based on the change.

In some cases, at least some of the mapping designation information is associated with one or more moving objects within the FOV and wherein the processing circuitry is further configured to: upon identifying a change in an orientation of the at least one detector relative to the moving objects, update the at least some of the mapping designation information based on the change.

In some cases, at least some of the mapping designation information is associated with one or more moving objects within the FOV, the active 3D scanner is gimbaled to a platform by a gimbal, and the processing circuitry is further configured to: upon identifying a change in a first orientation of the platform relative to the moving objects, provide a control signal for rotating the active 3D scanner along the gimbal to maintain a second orientation of the at least one detector relative to the moving objects notwithstanding the change in the first orientation of the platform relative to the moving objects.

In some cases, the active 3D scanner is mounted on a platform, and at least some of the mapping designation information is generated to reduce an exposure of the platform to sensors that are capable of detecting the energy pulses.

In some cases, the active 3D scanner is mounted on a platform, and at least some of the mapping designation information is generated to reduce temporary blinding of sensors on the platform or external to the platform.

In some cases, the active 3D scanner is mounted on an airborne platform, and wherein, during a landing approach for landing the airborne platform at a selected landing area, the part of the FOV is associated with one or more of: the selected landing area or a path to the selected landing area.

In some cases, the active 3D scanner is mounted on an airborne platform, and wherein, during flight of the airborne platform along a flight path, the part of the FOV is associated with one or more flight paths pre-approved for flying the airborne platform.

In some cases, the processing circuitry is further configured to: obtain targeting designation information that designates one or more designated targets; and activate the at least one energy emitting source to emit one or more targeting energy pulses towards the designated targets.

In some cases, the targeting designation information is obtained from a user of the system.

In some cases, the targeting designation information is obtained from a tracker that tracks a line-of-sight between the user and the designated targets.

In some cases, the at least one energy emitting source is a Light Detection and Ranging (LiDAR), and the energy pulses are laser pulses.

In some cases, the at least one energy emitting source is a radar, and the energy pulses are radio pulses.

In some cases, the radar is a frequency-modulated continuous-wave (FMCW) radar.

In accordance with a second aspect of the presently disclosed subject matter, there is provided a system for generating a three-dimensional (3D) map of part of a field-of-view (FOV) of at least one detector of an active 3D scanner mounted on a moving platform, the system comprising: the active 3D scanner, comprising: a scanning mechanism configured to scan the FOV; at least one energy emitting source configured to emit energy pulses, in synchronization with the scanning mechanism, to cover the FOV, and the at least one detector; and processing circuitry configured to: provide a pre-loaded 3D model of a mission area, pre-loaded prior to performing a mission by the moving platform; obtain a current location of the moving platform; determine mapping designation information based on the 3D model, the current location and one or more mapping designation rules; selectively activate the at least one energy emitting source in synchronization with the scanning mechanism to emit only a subset of the energy pulses to cover the part of the FOV, in accordance with the mapping designation information; obtain current readings, from the at least one detector, based on reflections of the subset of the energy pulses; and generate the 3D map based on the current readings.

In accordance with a third aspect of the presently disclosed subject matter, there is provided a method for generating a three-dimensional (3D) map of part of a field-of-view (FOV) of at least one detector of an active 3D scanner, the method comprising: obtaining mapping designation information, the mapping designation information being independent of past readings obtained by the at least one detector, if any; selectively activating at least one energy emitting source of the active 3D scanner to emit a first number of energy pulses, in accordance with the mapping designation information and in synchronization with a scanning mechanism of the active 3D scanner, to cover the part of the FOV, wherein the scanning mechanism is configured to scan the FOV, and wherein the at least one energy emitting source is configured to emit a second number of energy pulses, in synchronization with the scanning mechanism, to cover the FOV, the second number of energy pulses being greater than the first number of energy pulses; obtaining current readings, from at least one detector of the active 3D scanner, based on reflections of the first number of energy pulses; and generating the 3D map based on the current readings.

In some cases, the mapping designation information includes a designation of the part of the FOV or a second part of the FOV that is not the part of the FOV.

In some cases, the mapping designation information includes a designation of pixel resolutions of the 3D map for one or more regions within the part of the FOV.

In some cases, the mapping designation information includes a designation of energy levels of one or more first energy pulses of the first number of energy pulses.

In some cases, at least some of the mapping designation information is obtained from a user of the active 3D scanner.

In some cases, the at least some of the mapping designation information is obtained from a tracker that tracks a line-of-sight between the user and a region within the part of the FOV.

In some cases, at least some of the mapping designation information is based on a geolocation of one or more objects within the FOV.

In some cases, the geolocation of at least one of the objects is stored in a geographical database.

In some cases, at least some of the mapping designation information is based on a terrain elevation map.

In some cases, at least some of the mapping designation information is based on a decoded image that includes the part of the FOV.

In some cases, the at least one energy emitting source is selectively activated, at least in part, to conserve energy resources of the active 3D scanner.

In some cases, at least some of the mapping designation information is associated with one or more fixed coordinate areas within the FOV having fixed coordinates in a fixed coordinate system established in space, and the method further comprises: upon identifying a change in a position of the at least one detector relative to the fixed coordinate areas, updating the at least some of the mapping designation information based on the change.

In some cases, at least some of the mapping designation information is associated with one or more fixed coordinate areas within the FOV having fixed coordinates in a fixed coordinate system established in space, and the method further comprises: upon identifying a change in an orientation of the at least one detector relative to the fixed coordinate areas, updating the at least some of the mapping designation information based on the change.

In some cases, at least some of the mapping designation information is associated with one or more fixed coordinate areas within the FOV having fixed coordinates in a fixed coordinate system established in space, the active 3D scanner is gimbaled to a platform by a gimbal, and the method further comprises: upon identifying a change in a first orientation of the platform relative to the fixed coordinate areas, providing a control signal for rotating the active 3D scanner along the gimbal to maintain a second orientation of the at least one detector relative to the fixed coordinate areas notwithstanding the change in the first orientation of the platform relative to the fixed coordinate areas.

In some cases, at least some of the mapping designation information is associated with one or more moving objects within the FOV, and the method further comprises: upon identifying a change in a position of the at least one detector relative to the moving objects, updating the at least some of the mapping designation information based on the change.

In some cases, at least some of the mapping designation information is associated with one or more moving objects within the FOV, and the method further comprises: upon identifying a change in an orientation of the at least one detector relative to the moving to objects, updating the at least some of the mapping designation information based on the change.

In some cases, at least some of the mapping designation information is associated with one or more moving objects within the FOV, the active 3D scanner is gimbaled to a platform by a gimbal, and the method further comprises: upon identifying a change in a first orientation of the platform relative to the moving objects, providing a control signal for rotating the active 3D scanner along the gimbal to maintain a second orientation of the at least one detector relative to the moving objects notwithstanding the change in the first orientation of the platform relative to the moving objects.

In some cases, the active 3D scanner is mounted on a platform, and at least some of the mapping designation information is generated to reduce an exposure of the platform to sensors that are capable of detecting the energy pulses.

In some cases, the active 3D scanner is mounted on a platform, and at least some of the mapping designation information is generated to reduce temporary blinding of sensors on the platform or external to the platform.

In some cases, the active 3D scanner is mounted on an airborne platform, and wherein, during a landing approach for landing the airborne platform at a selected landing area, the part of the FOV is associated with one or more of: the selected landing area or a path to the selected landing area.

In some cases, the active 3D scanner is mounted on an airborne platform, and wherein, during flight of the airborne platform along a flight path, the part of the FOV is associated with one or more flight paths pre-approved for flying the airborne platform.

In some cases, the method further comprises: obtaining targeting designation information that designates one or more designated targets, and activating the at least one energy emitting source to emit one or more targeting energy pulses towards the designated targets.

In some cases, the targeting designation information is obtained from a user of the active 3D scanner.

In some cases, the targeting designation information is obtained from a tracker that tracks a line-of-sight between the user and the designated targets.

In some cases, the at least one energy emitting source is a Light Detection and Ranging (LiDAR), and the energy pulses are laser pulses.

In some cases, the at least one energy emitting source is a radar, and the energy pulses are radio pulses.

In some cases, the radar is a frequency-modulated continuous-wave (FMCW) radar.

In accordance with a fourth aspect of the presently disclosed subject matter, there is provided a method for generating a three-dimensional (3D) map of part of a field-of-view (FOV) of at least one detector of an active 3D scanner mounted on a moving platform, the method comprising: providing a pre-loaded 3D model of a mission area, pre-loaded prior to performing a mission by the moving platform; obtaining a current location of the moving platform; determining mapping designation information based on the 3D model, the current location and one or more mapping designation rules; selectively activating at least one energy emitting source of the active 3D scanner to emit a first number of energy pulses, in accordance with the mapping designation information and in synchronization with a scanning mechanism of the active 3D scanner, to cover the part of the FOV, wherein the scanning mechanism is configured to scan the FOV, and wherein the at least one energy emitting source is configured to emit a second number of energy pulses, in synchronization with the scanning mechanism, to cover the FOV, the second number of energy pulses being greater than the first number of energy pulses; obtaining current readings, from at least one detector, based on reflections of the first number of energy pulses; and generating the 3D map based on the current readings.

In accordance with a fifth aspect of the presently disclosed subject matter, there is provided a non-transitory computer readable storage medium having computer readable program code embodied therewith, the computer readable program code, executable by processing circuitry of a computer to perform a method for generating a three-dimensional (3D) map of part of a field-of-view (FOV) of at least one detector of an active 3D scanner, the method comprising: obtaining mapping designation information, the mapping designation information being independent of past readings obtained by the at least one detector, if any; selectively activating at least one energy emitting source of the active 3D scanner to emit a first number of energy pulses, in accordance with the mapping designation information and in synchronization with a scanning mechanism of the active 3D scanner, to cover the part of the FOV, wherein the scanning mechanism is configured to scan the FOV, and wherein the at least one energy emitting source is configured to emit a second number of energy pulses, in synchronization with the scanning mechanism, to cover the FOV, the second number of energy pulses being greater than the first number of energy pulses; obtaining current readings, from at least one detector of the active 3D scanner, based on reflections of the first number of energy pulses; and generating the 3D map based on the current readings.

In accordance with a sixth aspect of the presently disclosed subject matter, there is provided a non-transitory computer readable storage medium having computer readable program code embodied therewith, the computer readable program code, executable by processing circuitry of a computer to perform a method for generating a three-dimensional (3D) map of part of a field-of-view (FOV) of at least one detector of an active 3D scanner mounted on a moving platform, the method comprising: providing a pre-loaded 3D model of a mission area, pre-loaded prior to performing a mission by the moving platform; obtaining a current location of the moving platform; determining mapping designation information based on the 3D model, the current location and one or more mapping designation rules; selectively activating at least one energy emitting source of the active 3D scanner to emit a first number of energy pulses, in accordance with the mapping designation information and in synchronization with a scanning mechanism of the active 3D scanner, to cover the part of the FOV, wherein the scanning mechanism is configured to scan the FOV, and wherein the at least one energy emitting source is configured to emit a second number of energy pulses, in synchronization with the scanning mechanism, to cover the FOV, the second number of energy pulses being greater than the first number of energy pulses; obtaining current readings, from at least one detector, based on reflections of the first number of energy pulses; and generating the 3D map based on the current readings.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

In the following detailed description, numerous specific details are se forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "scanning", "emitting", "obtaining", "activating", "generating", "updating", "identifying", "providing" or the like, include actions and/or processes, including, inter alia, actions and/or processes of a computer, that manipulate and/or transform data into other data, said data represented as physical quantities, e.g. such as electronic quantities, and/or said data representing the physical objects. The terms "computer", "processor", "processing circuitry" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field-programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 1:
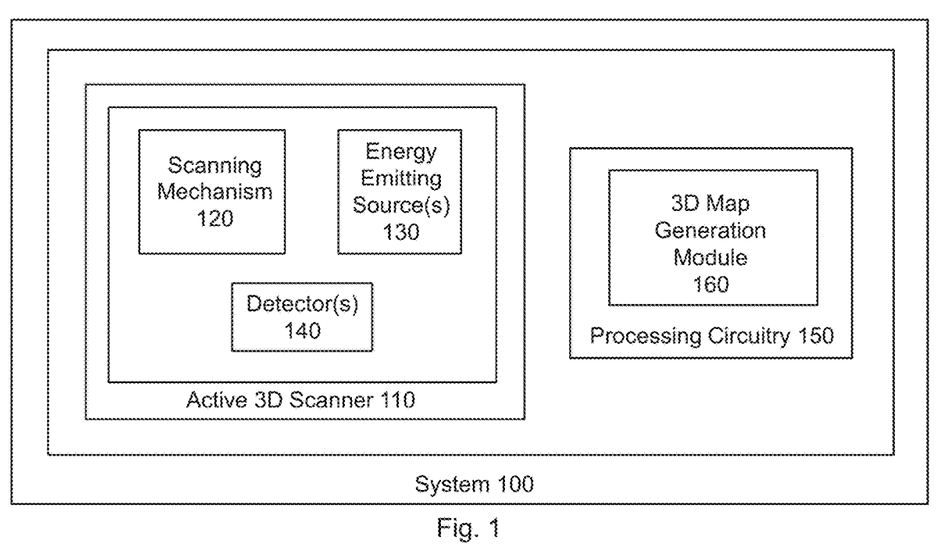
FIG. 1 is a block diagram schematically illustrating one example of a system for generating a three-dimensional (3D) map, in accordance with the presently disclosed subject matter.
Figure 2:
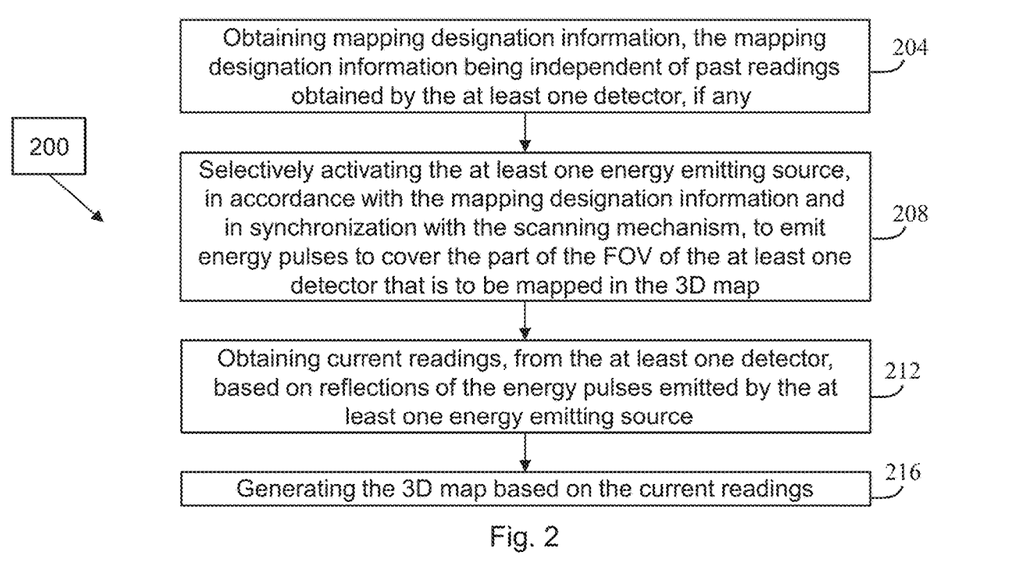
FIG. 2 is a flowchart illustrating a first example of a method for generating a 3D map, in accordance with the presently disclosed subject matter.
Figure 3:
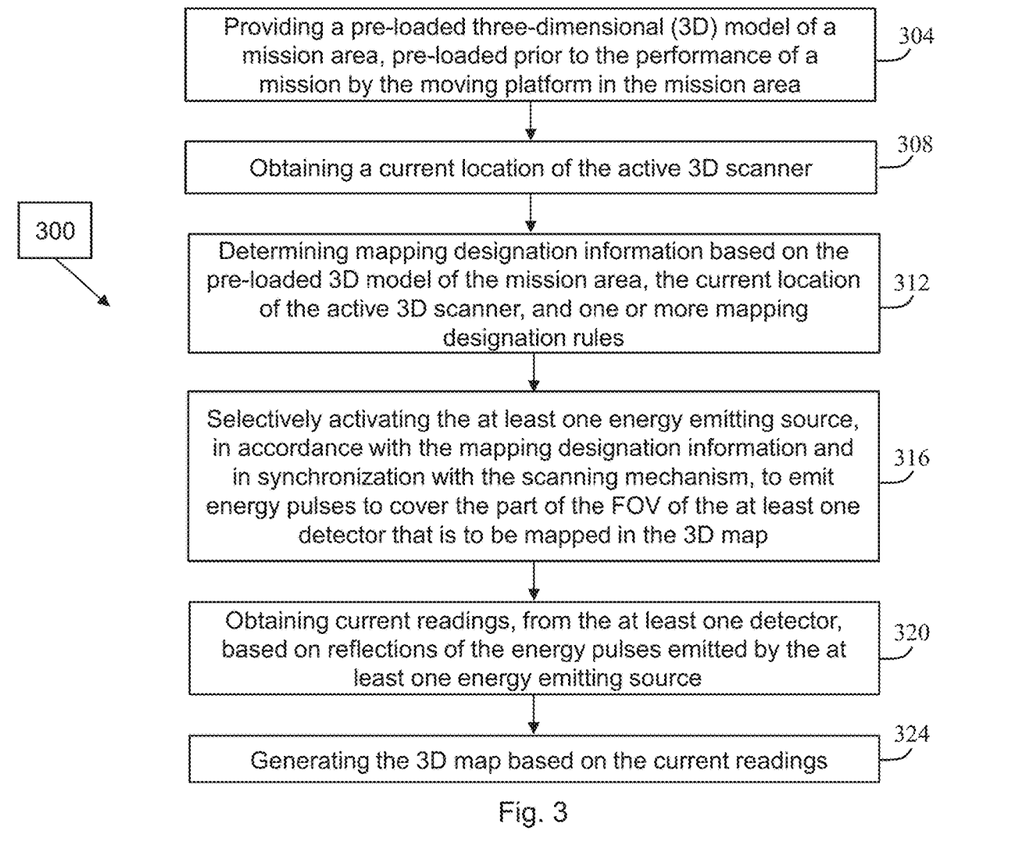
FIG. 3 is a flowchart illustrating a second example of a method for generating a 3D map, in accordance with the presently disclosed subject matter.

In embodiments of the presently disclosed subject matter, fewer, more and/or different stages than those shown in FIGS. 2 and 3 may be executed. In embodiments of the presently disclosed subject matter one or more stages illustrated in FIGS. 2 and 3 may be executed in a different order and/or one or more groups of stages may be executed simultaneously. FIG. 1 illustrates a general schematic of the system architecture in accordance with embodiments of the presently disclosed subject matter. Each module in FIG. 1 can be made up of any combination of software, hardware and/or firmware that performs the functions as defined and explained herein. The modules in FIG. 1 may be centralized in one location or dispersed over more than one location. In other embodiments of the presently disclosed subject matter, the system may comprise fewer, more, and/or different modules than those shown in FIG. 1.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Attention is now drawn to FIG. 1, a block diagram schematically illustrating one example of a system 100 for generating a three-dimensional (3D) map, in accordance with the presently disclosed subject matter.

In accordance with the presently disclosed subject matter, system 100 can be configured to include an active 3D scanner 110. Active 3D scanner 110 can be configured to include a scanning mechanism 120, at least one energy emitting source 130, and at least one detector 140.

Scanning mechanism 120 can be configured to scan a field-of-view (FOV) of the at least one detector 140. In some cases, scanning mechanism 120 can be a mechanical scanning mechanism, for example, a mechanical scanning array. Alternatively, in some cases, scanning mechanism 120 can be an optical scanning mechanism, for example, an optical phased array. As a further alternative, in some cases, scanning mechanism 120 can be an electronic scanning mechanism, for example, an electronically scanned array.

The at least one energy emitting source 130 can be configured to emit energy pulses at a pre-defined rate to cover the FOV, in synchronization with scanning mechanism 120. In some cases, the at least one energy emitting source 130 can be a Light Detection and Ranging (LiDAR), and the energy pulses can be laser pulses. In some cases, the at least one energy emitting source 130 can be a radar, and the energy pulses can be radio microwave pulses. In some cases, the radar can be a frequency-modulated continuous-wave (FMCW) radar.

The at least one detector 140 can be configured to obtain readings based on reflections of energy pulses emitted by the at least one energy emitting source 130.

In some cases, active 3D scanner 110 can be mounted on a movable platform. In some cases, the platform can be a land-based platform. In some cases, the platform can be an airborne platform.

System 100 can be further configured to include processing circuitry 150. Processing circuitry 150 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data.

Processing circuitry 150 can be configured to include a 3D map generation module 160. 3D map generation module 160 can be configured to generate a 3D map of part of a FOV of the at least one detector 140 based on reflections of energy pulses, emitted by the at least one energy emitting source 130, that are obtained by the at least one detector 140, as detailed further herein, inter alia with reference to FIGS. 2 and 3.

Additionally, in some cases, processing circuitry 150 can be configured to designate one or more designated targets, as detailed further herein, inter alia with reference to FIG. 2. Attention is now drawn to FIG. 2, a flowchart 200 illustrating a first example of a method for generating a 3D map, in accordance with the presently disclosed subject matter.

In accordance with the presently disclosed subject matter, system 100 can be configured, e.g. using 3D map generation module 160, to generate a 3D map of part of a FOV of the at least one detector 140.

For this purpose, system 100 can be configured to obtain mapping designation information, which is indicative of the part of the FOV of the at least one detector 140 that is to be mapped in the 3D map. In some cases, the mapping designation information can positively designate the part of the FOV of the at least one detector 140 that is to be mapped in the 3D map. Alternatively, in some cases, the mapping designation information can designate a second part of the FOV of the at least one detector 140 that is not to be mapped in the 3D map, thereby indirectly designating the part of the FOV of the at least one detector 140 that is to be mapped in the 3D map. The part of the FOV of the at least one detector 140 that is to be mapped in the 3D map can be a contiguous region within the FOV of the at least one detector 140, or alternatively, can be a plurality of non-contiguous regions within the FOV of the at least one detector 140. Each of the regions within the FOV that are to be mapped can be covered by one or more pixels of the 3D map.

In some cases, the mapping designation information can be independent of past readings obtained by the at least one detector 140, if any (block 204). In some cases, the mapping designation information can designate a region to be mapped or not to be mapped in the absence of or irrespective of a 3D map that maps the region. Similarly, the mapping designation information can designate the region to be mapped or not to be mapped without using past readings even when no past readings obtained by the at least one detector 140 are available, or even when no such past readings have been acquired.

System 100 can be configured to scan a FOV of the at least one detector 140, in accordance with the mapping designation information, to generate a 3D map of part of the FOV. Specifically, system 100 can be configured, during a scan of the FOV by scanning mechanism 120, to selectively activate the at least one energy emitting source 130, in accordance with the mapping designation information and in synchronization with the scanning mechanism 120 to cover the part of the FOV that is to be mapped in the 3D map (block 208). Put differently, system 100 can be configured to selectively activate the at least one energy emitting source 130 to emit only a subset of the energy pulses that the at least one energy emitting source 130 is configured to emit, the subset of the energy pulses being emitted only towards the part of the FOV that is to be mapped in the 3D map. In some cases, system 100 can be configured to control, for each pixel in the 3D map, whether to emit an energy pulse towards a point in the FOV that corresponds to the respective pixel.

System 100 can be configured to obtain current readings, from the at least one detector 140, based on reflections of the energy pulses emitted by the at least one energy emitting source 130 (block 212). System 100 can be further configured to generate the 3D map based on the current readings (block 216).

In some cases, the mapping designation information can be indicative of pixel resolutions of one or more regions within the 3D map that cover a corresponding one or more regions within the part of the FOV of the at least one detector 140 that are to be mapped in the 3D map. In some cases, the mapping designation information can designate a rate of emission of energy pulses that are to be emitted towards given regions within the FOV that are to be mapped, for example, in accordance with designated pixel resolutions of the corresponding regions within the 3D map. In some cases, the designation of the rate at which to emit the energy pulses for each of the regions can be based on operational considerations.

In some cases, the mapping designation information can designate energy levels (e.g., intensity levels) of one or more energy pulses that are to be emitted by the at least one energy emitting source 130. In some cases, a designated energy level of a respective energy pulse can be based on a distance between the at least one energy emitting source 130 and a point in the FOV that is to be illuminated by the respective energy pulse. Additionally, or alternatively, in some cases, a designated energy level of the respective energy pulse can be based on an amplitude of a prior reading(s) by the at least one detector 140, which can be a function of a physical parameter(s) of the point(s) within the FOV that are covered by the respective energy pulse and/or environmental conditions (e.g., the energy pulses that are emitted in degraded visual environment (DVE) conditions may be emitted at a higher energy level than energy pulses that are emitted in the absence of DVE conditions).

In some cases, mapping designation information can be obtained, by system 100, from a user of system 100. In some cases, the mapping designation information can be obtained from the user via a computer-based user interface. Additionally, or alternatively, in some cases, the user can designate points (e.g., continuously) within the FOV of the at least one detector 140 that are to be mapped in the 3D map via a line-of-sight (LOS) tracker that tracks a LOS between the user and some or all of the part of the FOV to be mapped in the 3D map. In some cases, the tracker can be mounted on a helmet/Head-Mounted Display (HMD) worn by the user. Similarly, the user can designate regions to be mapped over a pre-loaded 3D map displayed to the user on a Head-Mounted Display (HMD) worn by the user.

In some cases, at least some of the mapping designation information can be determined by system 100 based on a geolocation of one or more objects within the FOV of the at least one detector 140 and one or more mapping designation rules that are indicative of whether the objects are to be mapped or are not to be mapped. For example, in the case that the active 3D scanner 110 is mounted on a moving airborne platform, one or more mapping designation rules can designate that structures on the ground along a path of the airborne platform are to be mapped or are not to be mapped. The geolocation of the objects can be obtained from a geographical database or any other source that indicates a geolocation of objects within at least part of the FOV of the at least one detector 140, including, inter ilia, a pre-loaded 3D map of the at least part of the FOV.

In some cases, the mapping designation rules can include a rule that limits the points within the FOV of the at least one detector 140 that can potentially be mapped to points within a pre-defined distance of the at least one detector 140 and/or within a predefined angular range relative to the at least one detector 140.

In some cases, in which the active 3D scanner 110 is mounted on a moving platform, system 100 can be configured to determine mapping designation information based on: (a) a pre-loaded 3D model of a mission area, pre-loaded prior to the performance of a mission by the moving platform in the mission area, (b) a current location of the active 3D scanner 110, e.g. using a priori knowledge of its location with respect to the platform, and (c) one or more mapping designation rules (e.g., a rule that limits the points within the FOV of the at least one detector 140 that can potentially be mapped to points within a pre-defined distance of the at least one detector 140 and/or within a predefined angular range relative to the at least one detector 140).

In some cases, the pre-loaded 3D model can be a terrain elevation map. In some cases, the terrain elevation map can be a Digital Elevation Model (DEM). In some cases, in which active 3D scanner 110 is mounted on a moving airborne platform, for example, on an underside of the airborne platform, system 100 can be configured to selectively activate the at least one energy emitting source 130 to only emit energy pulses that are expected to hit the ground or objects on the ground, in accordance with the terrain elevation map (e.g., DEM), a current location of the active 3D scanner 110, and a mapping designation rule that informs system 100 to map only points on the ground or objects on the ground, based on the terrain elevation map (e.g., DEM). In some cases, the DEM can be formed in accordance with the Digital Terrain Elevation Data (DTED) standard.

In some cases, mapping designation information can be determined by system 100 based on a decoded image of at least some of the FOV of the at least one detector 140 (e.g., a previous 3D map that is generated by system 100), and, optionally, one or more mapping designation rules, if any, as detailed earlier herein. In some cases, the decoded image is not based on past readings obtained by the at least one detector 140, if any. By determining mapping designation information in accordance with the decoded image, system 100 can compensate for momentary drifts or inaccuracies, and thereby better ensure that the at least one energy emitting source 130 does not emit energy pulses towards points in the FOV of the at least one detector 140 that are to be blanked.

In some cases, the decoded image can indicate that one or more objects are present in the at least some of the FOV of the at least one detector 140 covered by the decoded image, and the mapping designation information that is based on the decoded image can designate, optionally in accordance with one or more mapping designation rules, if any, that at least some of the objects are to be mapped or are not to be mapped in the 3D map.

In some cases, at least some of the mapping designation information can be associated with one or more fixed coordinate areas within the FOV of the at least one detector 140, the fixed coordinate areas having fixed coordinates in a fixed coordinate system established in space. In some cases, the fixed coordinate areas within the FOV can be associated with one or more stationary objects.

In some cases, in which active 3D scanner 110 is mounted on a moving platform and a 3D map that is associated with the fixed coordinate areas has been generated based on readings obtained by the at least one detector 140 while located at first coordinates in the fixed coordinate system, the 3D map can be projected into the FOV of the at least one detector 140 when the at least one detector 140 is located at second coordinates in the fixed coordinate system, and system 100 can be configured to update the mapping designation information associated with the fixed coordinate areas in accordance with a change in a position and/or an orientation of the at least one detector 140 between the first coordinates and the second coordinates. As a non-limiting example, if at the first coordinates the at least one detector 140 was located five kilometers from the fixed coordinate areas and at the second coordinates the at least one detector 140 is located one kilometer from the fixed coordinate areas, the part of the FOV of the at least one detector 140 that includes the fixed coordinate areas when the al least one detector 140 is located at the second coordinates is greater than the part of the FOV of the at least one detector 140 that includes the fixed coordinate areas when the at least one detector 140 is located at the first coordinates. System 100 can be configured to update the mapping designation information associated with the fixed coordinate areas based on the change in the position of the at least one detector 140 between the first coordinates and the second coordinates (e.g., designate a larger part of the FOV of the at least one detector 140 for obtaining energy pulses). Additionally, or alternatively, the mapping designation information can be continuously updated to compensate for movements of the platform during a given scan.

In some cases, in which active 3D scanner 110 is gimbaled to the moving platform by a gimbal and an orientation of the moving platform relative to the fixed coordinate areas changes after generation of a 3D map that is associated with the fixed coordinate areas, the change in the orientation can be compensated, at least in part, by the gimbal (i.e., by providing a control signal for rotating the active 3D scanner 110 along the gimbal), such that the mapping designation information does not need to be updated to account for any or all of the change in the orientation of the moving platform between the generation of successive 3D maps.

In some cases, at least some of the mapping designation information can be associated with one or more moving objects within the FOV of the at least one detector 140. System 100 can be configured to generate a 3D map that includes a mapping of the moving objects. Due to the movement of the moving objects, a position and/or an orientation of the at least one detector 140 relative to the moving objects can change over time, whether or not active 3D scanner 110 is mounted on a moving platform. System 100 can be configured to update the mapping designation information to compensate for the change in the position and/or the orientation of the at least one detector 140 relative to the moving objects between the generation of successive 3D maps.

In some cases, in which active 3D scanner 110 is gimbaled to a moving platform by a gimbal, a change in an orientation of the moving platform relative to the moving objects can be compensated by the gimbal (i.e., by providing a control signal for rotating the active 3D scanner 110 along the gimbal), such that the mapping designation information does not need to be updated to account for any or all of the change in the relative orientation between the active 3D scanner 110 and the moving objects between the generation of successive 3D maps.

In some cases, in which active 3D scanner 110 is mounted on a platform, at least some of the mapping designation information can be generated to prevent or limit the emission of energy pulses by at least one energy emitting source 130 towards a part of the FOV of the at least one detector 140 that is occupied by one or more energy-detecting sensors that are capable of detecting the energy pulses. In some cases, the emission of the energy pulses towards this part of the FOV can be prevented or limited to reduce or prevent an exposure of the platform to the energy-detecting sensors. Additionally, or alternatively, in some cases, the emission of the energy pulses towards this part of the FOV can be prevented or limited to reduce or prevent the temporary blinding of the energy-detecting sensors by the energy pulses, the energy-detecting sensors being on the platform or being external to the platform. Additionally, or alternatively, in some cases, system 100 can be configured to determine mapping designation information to limit a distance and/or an angular range over which energy pulses are allowed to travel, for example, to reduce or prevent an exposure of the platform to energy-detecting sensors, to avoid emitting energy pulses towards components of the platform (e.g., an external refueling pipe of an airborne platform), to limit the energy pulses to an effective range of active 3D scanner 110 and/or to conserve energy resources of the system 100 (e.g., the energy consumption, the processing overhead required to generate the 3D map, etc.).

In some cases, mapping designation information can be determined so that the at least one energy emitting source 130 will only emit energy pulses towards a region of interest (ROI) within the FOV of the at least one detector 140 (e.g., towards objects of interest within the FOV) to conserve energy resources of the system 100 (e.g., the energy consumption, the processing overhead required to generate the 3D map, etc.).

In some cases, in which active 3D scanner 110 is mounted on an airborne platform, and in which the airborne platform is performing a landing approach to land at a selected landing area, the mapping designation information can designate for mapping the part of the FOV of the at least one detector 140 that is associated with the selected landing area. In some cases, the mapping designation information can also designate for mapping one or more possible paths along which the airborne platform can be landed (e.g., to detect objects that are present along the possible paths). In this manner, the airborne platform can be safely landed. In addition, in some cases, one or more of the following may result: the exposure of the platform to energy detecting sensors may be reduced or prevented, the temporary blinding of energy-detecting sensors (on the platform or external to the platform) may be reduced or prevented, or energy resources of the system 100 may be conserved. Moreover, in some cases, the mapping designation information can be indicative of different pixel resolutions for different areas within the mapped part of the FOV that are associated with the selected landing area (e.g., by designating different energy pulse emission rates for the different areas within the selected landing area), in accordance with an image resolution required for each of the different areas, thereby, among other things, conserving energy resources.

In some cases, in which active 3D scanner 110 is mounted on an airborne platform, and in which the airborne platform is flying along a flight path, the mapping designation information can designate for mapping the part of the FOV of the at least one detector 140 that is associated with one or more flight paths pre-approved for flying the airborne platform. This can result in one or more of the following advantages: reducing or preventing the exposure of the platform to energy detecting sensors, reducing or preventing the temporary blinding of energy-detecting sensors (on the platform or external to the platform), preventing an emission of energy pulses towards parts of the airborne platform (for example, an external refueling pipe), limiting the energy pulses to an effective range of active 3D scanner 110, or conserving energy resources of the system 100. Moreover, in some cases, the mapping designation information can be indicative of different pixel resolutions for different areas within the mapped part of the FOY that are associated with the pre-approved flight paths (e.g., by designating different energy pulse emission rates for different areas within the FOV that are associated with the pre-approved flight paths), in accordance with an image resolution required for the mapped points in the part of the FOV associated with the pre-approved flight paths. This can also result in one or more of the advantages provided immediately above.

In some cases, processing circuitry 150 can also be configured to designate one or more designated targets by obtaining targeting designation information that designates the designated targets, and activating the at least one energy emitting source 130 to emit one or more targeting energy pulses towards the designated targets. In some cases, the targeting designation information can be obtained from a user of the system 100, for example, via a tracker that tracks a line-of-sight between the user and the designated targets. In some cases, the tracker can be mounted on a helmet/HMD worn by the user.

Attention is now drawn to FIG. 3, a flowchart 300 illustrating a second example of a method for generating a 3D map, in accordance with the presently disclosed subject matter.

In accordance with the presently disclosed subject matter, system 100 can be configured, using 3D map generation module 160, to generate a 3D map of part of a FOV of the at least one detector 140 of active 3D scanner 110, wherein active 3D scanner 110 is mounted on a moving platform.

In some cases, system 100 can be configured to provide a pre-loaded 3D model of a mission area, pre-loaded prior to the performance of a mission by the moving platform in the mission area (block 304).

Additionally, prior to performance of a scan of a FOV of the at least one detector 140 within the mission area, system 100 can be configured to obtain a current location of the active 3D scanner 110 (block 308), e.g. using a priori knowledge of its location with respect to the platform.

System 100 can be further configured to determine mapping designation information based on the pre-loaded 3D model of the mission area, the current location of the active 3D scanner 110, and one or more mapping designation rules (block 312). The mapping designation information is indicative of the part of the FOV of the at least one detector 140 that is to be mapped in the 3D map. An example of a mapping designation rule is a rule that limits the points within the FOV of the at least one detector 140 that can potentially be mapped to points within a pre-defined distance of the at least one detector 140 and/or within a predefined angular range relative to the at least one detector 140.

In some cases, the pre-loaded 3D model can be a terrain elevation map, in some cases, the terrain elevation map can be a Digital Elevation Model (DEM). In some cases, in which active 3D scanner 110 is mounted on a moving airborne platform, for example, on an underside of the airborne platform, system 100 can be configured to selectively activate the at least one energy emitting source 130 to only emit energy pulses that are expected to hit the ground or objects on the ground, in accordance with the terrain elevation map (e.g., DEM), current location of the active 3D scanner 110, and a mapping designation rule that informs system 100 to map only points on the ground or objects on the ground, based on the terrain elevation map (e.g., DEM). In some cases, the DEM can be formed in accordance with the Digital Terrain Elevation Data (DTED) standard.

In some cases, the mapping designation information can positively designate the part of the FOV of the at least one detector 140 that is to be mapped in the 3D map. Alternatively, in some cases, the mapping designation information can designate a second part of the FOV of the at least one detector 140 that is not to be mapped in the 3D map, thereby indirectly designating the part of the FOV of the at least one detector 140 that is to be mapped in the 3D map. The part of the FOV of the at least one detector 140 that is to be mapped in the 3D map can be a contiguous region within the FOV of the at least one detector 140, or alternatively, can be a plurality of non-contiguous regions within the FOV of the at least one detector 140. Each of the regions within the FOV that are to be mapped can be covered by one or more pixels of the 3D map.

In some cases, the mapping designation information can be independent of past readings obtained by the at least one detector 140, if any. The mapping designation information can designate the region to be mapped or not to be mapped without using past readings obtained by the at least one detector 140 even when no past readings obtained by the at least one detector 140 are available, or even when no such past readings have been acquired.

System 100 can be configured to scan a FOV of the at least one detector 140 in accordance with the mapping designation information, for the purpose of generating a 3D map of part of the FOV. Specifically, system 100 can be configured, during a scan of the FOV by scanning mechanism 120, to selectively activate the at least one energy emitting source 130, in accordance with the mapping designation information and in synchronization with the scanning mechanism 120, to cover the part of the FOV of the at least one detector 140 that is to be mapped in the 3D map (block 316). Put differently, system 100 can be configured to selectively activate the at least one energy emitting source 130 to emit only a subset of the energy pulses that the at least one energy emitting source 130 is configured to emit, the subset of the energy pulses being emitted only towards the part of the FOV that is to be mapped in the 3D map. In some cases, system 100 can be configured to control, for each pixel in the 3D map, whether to emit an energy pulse towards a point in the FOV that corresponds to the respective pixel.

System 100 can be configured to obtain current readings, from the at least one detector 140, based on reflections of the energy pulses emitted by the at least one energy emitting source 130 (block 320). System 100 can be further configured to generate the 3D map of the part of the FOV of the at least one detector 140 based on the current readings (block 324).

In some cases, the mapping designation information can be indicative of pixel resolutions of one or more regions within the 3D map that cover a corresponding one or more regions within the part of the FOV of the at least one detector 140 that are to be mapped in the 3D map. In some cases, the mapping designation information can designate a rate of emission of energy pulses that are to be emitted towards given regions within the FOY that are to be mapped, for example, in accordance with designated pixel resolutions of the corresponding regions within the 3D map. In some cases, the designation of the rate at which to emit the energy pulses for each of the regions can be based on operational considerations.

In some cases, the mapping designation information can designate energy levels (e.g., intensity levels) of one or more energy pulses that are to be emitted by the at least one energy emitting source 130. In some cases, a designated energy level of a respective energy pulse can be based on a distance between the at least one energy emitting source 130 and a point in the FOV that is to be illuminated by the respective energy pulse. Additionally, or alternatively, in some cases, a designated energy level of the respective energy pulse can be based on an amplitude of a prior reading(s) by the at least one detector 140, which can be a function of a physical parameter(s) of the point(s) within the FOV that are covered by the respective energy pulse and/or environmental conditions (e.g., the energy pulses that are emitted in degraded visual environment (DVE) conditions may be emitted at a higher level than energy pulses that are emitted in the absence of DVE conditions).

In some cases, mapping designation information can be obtained, by system 100, from a user of system 100. In some cases, the user can provide mapping designation information to system 100 via a computer-based user interface. Additionally, or alternatively, in some cases, the user can designate points (e.g., continuously) within the FOV of the at least one detector 140 that are to be mapped in the 3D map via a line-of-sight (LOS) tracker that tracks a LOS between the user and the points. In some cases, the tracker can be mounted on a helmet/Head-Mounted Display (HMD) worn by the user. Similarly, the user can designate regions to be mapped over a pre-loaded 3D map displayed to the user on a Head-Mounted Display (HMD) worn by the user.

In some cases, at least some of the mapping designation information can be determined by system 100 based on a geolocation of one or more objects within the FOV of the at least one detector 140 and one or more mapping designation rules that are indicative of whether the objects are to be mapped or are not to be mapped. For example, in the case that the active 3D scanner 110 is mounted on a moving airborne platform, one or more mapping designation rules can designate that structures on the ground along a path of the airborne platform are to be mapped or are not to be mapped. The geolocation of the objects can be obtained from a geographical database or any other source that indicates a geolocation of objects within at least part of the FOV of the at least one detector 140, including, inter alia, a 3D map of the at least part of the FOV (for example, the pre-loaded 3D model).

In some cases, the mapping designation rules can include a rule that limits the points within the FOV of the at least one detector 140 that can potentially be mapped to points within a pre-defined distance of the at least one detector 140 and/or within a predefined angular range relative to the at least one detector 140.

In some cases, mapping designation information can be determined by system 100 based on a decoded image of at least part of the FOV of the at least one detector 140, and, optionally, one or more mapping designation rules, if any, as detailed earlier herein. In some cases, the decoded image is not based on past readings obtained by the at least one detector 140, if any. By determining mapping designation information in accordance with the decoded image, system 100 can compensate for momentary drifts or inaccuracies, and thereby better ensure that the at least one energy emitting source 130 does not emit energy pulses towards points in the FOV of the at least one detector 140 that are to be blanked.

In some cases, the decoded image can indicate that one or more objects are present in the at least part of the FOV of the at least one detector 140 covered by the decoded image, and the mapping designation information that is based on the decoded image can designate, optionally in accordance with one or more mapping designation rules, if any, that at least some of the objects are to be mapped or are not to be mapped in the 3D map.

In some cases, at least some of the mapping designation information can be associated with one or more fixed coordinate areas within the FOV of the at least one detector 140 (e.g., the fixed coordinate areas can include one or more stationary objects that are to be mapped based on the at least some of the mapping designation information), the fixed coordinate areas having fixed coordinates in a fixed coordinate system established in space. System 100 can be configured to generate a 3D map that is at least partially associated with the fixed coordinate areas.

In some cases, in which active 3D scanner 110 is mounted on a moving platform and a 3D map that is associated with the fixed coordinate areas has been generated based on readings obtained by the at least one detector 140 while located at first coordinates in the fixed coordinate system, the 3D map can be projected into the FOV of the at least one detector 140 when the at least one detector 140 is located at second coordinates in the fixed coordinate system, and system 100 can be configured to update the mapping designation information associated with the fixed coordinate areas in accordance with a change in a position and/or an orientation of the at least one detector 140 between the first coordinates and the second coordinates. As a non-limiting example, if at the first coordinates the at least one detector 140 was located five kilometers from the fixed coordinate areas and at the second coordinates the at least one detector 140 is located one kilometer from the fixed coordinate areas, the part of the FOV of the at least one detector 140 that includes the fixed coordinate areas when the at least one detector 140 is located at the second coordinates is greater than the part of the FOV of the at least one detector 140 that includes the fixed coordinate areas when the at least one detector 140 is located at the first coordinates, System 100 can be configured to update the mapping designation information associated with the fixed coordinate areas based on the change in the position of the at least one detector 140 between the first coordinates and the second coordinates (e.g., designate a larger part of the FOV of the at least one detector 140 for obtaining energy pulses). Additionally, or alternatively, the mapping designation information can be continuously updated to compensate for movements of the platform during a given scan.

In some cases, in which active 3D scanner 110 is gimbaled to the moving platform by a gimbal and an orientation of the moving platform relative to the fixed coordinate areas changes after generation of a 3D map that is associated with the fixed coordinate areas, the change in the orientation can be compensated, at least in part, by the gimbal (i.e., by providing a control signal for rotating the active 3D scanner 110 along the gimbal), such that the mapping designation information does not need to be updated to account for any or all of the change in the orientation of the moving platform between the generation of successive 3D maps.

In some cases, at least some of the mapping designation information can be associated with one or more moving objects within the FOV of the at least one detector 140. System 100 can be configured to generate a 3D map that includes a mapping of the moving objects. Due to the movement of the moving objects, a position and/or an orientation of the at least one detector 140 relative to the moving objects can change over time, whether or not active 3D scanner 110 is mounted on a moving platform. System 100 can be configured to update the mapping designation information to compensate for the change in the position and/or the orientation of the at least one detector 140 relative to the moving objects between the generation of successive 3D maps.

In some cases, in which active 3D scanner 110 is gimbaled to a moving platform by a gimbal, a change in an orientation of the moving platform relative to the moving objects can be compensated, at least in part, by the gimbal (i.e., by providing a control signal for rotating the active 3D scanner 110 along the gimbal), such that the mapping designation information does not need to updated to account for any or all of the change in the relative orientation between the active 3D scanner 110 and the moving objects between the generation of successive 3D maps.

In some cases, in which active 3D scanner 110 is mounted on a platform, at least some of the mapping designation information can be generated to prevent or limit the emission of energy pulses by at least one energy emitting source 130 towards a part of the FOV of the at least one detector 140 that is occupied by one or more energy-detecting sensors that are capable of detecting the energy pulses. In some cases, the emission of the energy pulses towards this part of the FOV can be prevented or limited to reduce or prevent an exposure of the platform to the energy-detecting sensors. Additionally, or alternatively, in some cases, the emission of the energy pulses towards this part of the FOV can be prevented or limited to reduce or prevent the temporary blinding of the energy-detecting sensors by the energy pulses, the energy-detecting sensors being on the platform or being external to the platform. Additionally, or alternatively, in some cases, at least some of the mapping designation information can be determined to limit a distance and/or an angular range over which energy pulses are allowed to travel, for example, to reduce or prevent an exposure of the platform to energy-detecting sensors, to avoid emitting energy pulses towards components of the platform (e.g., an external refueling pipe of an airborne platform), to limit the energy pulses to an effective range of active 3D scanner 110 and/or to conserve energy resources of the system 100 (e.g., the energy consumption, the processing overhead required to generate the 3D map, etc.).

In some cases, at least some of the mapping designation information can be generated so that the at least one energy emitting source 130 will only emit energy pulses towards a region of interest (ROI) within the FOV of the at least one detector 140 (e.g., towards objects of interest within the FOV) to conserve energy resources of the system 100 (e.g., the energy consumption, the processing overhead required to generate the 3D map).

In some cases, in which active 3D scanner 110 is mounted on an airborne platform, and in which the airborne platform is performing a landing approach to land at a selected landing area, the mapping designation information can designate for mapping the part of the FOV of the at least one detector 140 that is associated with the selected landing area. In some cases, the mapping designation information can also designate for mapping one or more possible paths along which the airborne platform can be landed (e.g., to detect objects that are present along the possible paths). In this manner, the airborne platform can be safely landed. In addition, in some cases, one or more of the following may result: the exposure of the platform to energy detecting sensors may be reduced or prevented, the temporary blinding of energy-detecting sensors (on the platform or external to the platform) may be reduced or prevented, or energy resources of the system 100 may be conserved. Moreover, in some cases, the mapping designation information can be indicative of different pixel resolutions for different areas within the mapped part of the FOV that are associated with the selected landing area (e.g., by designating different energy pulse emission rates for the different areas within the selected landing area), in accordance with an image resolution required for each of the different areas, thereby, among other things, conserving energy resources.

In some cases, in which active 3D scanner 110 is mounted on an airborne platform, and in which the airborne platform is flying along a flight path, the mapping designation information can designate for mapping the part of the FOV of the at least one detector 140 that is associated with one or more flight paths pre-approved for flying the airborne platform. This can result in one or more of the following advantages: reducing or preventing the exposure of the platform to energy detecting sensors, reducing or preventing the temporary blinding of energy-detecting sensors (on the platform or external to the platform), preventing an emission of energy pulses towards parts of the airborne platform (for example, an external refueling pipe), limiting the energy pulses to an effective range of active 3D scanner 110, or conserving energy resources of the system 100. Moreover, in some cases, the mapping designation information can be indicative of different pixel resolutions for different areas within the mapped part of the FOV that are associated with the pre-approved flight paths (e.g., by designating different energy pulse emission rates for different areas within the FOV that are associated with the pre-approved flight paths), in accordance with an image resolution required for the mapped points in the part of the FOV associated with the pre-approved flight paths. This can also result in one or more of the advantages provided immediately above.

It is to be noted that, with reference to FIGS. 2 and 3, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A system for generating a three-dimensional (3D) map of part of a field-of-view (FOV) of at least one detector of an active 3D scanner, the system comprising:
   the active 3D scanner, comprising:
      a scanning mechanism configured to scan the FOV;
      at least one energy emitting source configured to emit energy pulses, in synchronization with the scanning mechanism, to cover the FOV; and
      the at least one detector; and
   processing circuitry configured to:
      obtain mapping designation information, wherein at least some of the mapping designation information is tracker-based designation information that is designated by a user of the system via a tracker that tracks a line-of-sight between the user and the FOV;
      selectively activate the at least one energy emitting source to emit eta subset of the energy pulses, in accordance with the mapping designation information, including the tracker-based designation information, and in synchronization with the scanning mechanism, to cover the part of the FOV;
      obtain current readings, from the at least one detector, based on reflections of the subset of the energy pulses; and
      generate the 3D map based on the current readings.

2. The system of claim 1, wherein at least some of the mapping designation information is associated with one or more fixed coordinate areas within the FOV having fixed coordinates in a fixed coordinate system established in space and wherein the processing circuitry is further configured to:
   upon identifying a change in at least one of a position or an orientation of the at least one detector relative to the fixed coordinate areas, update the at least some of the mapping designation information based on the change.

3. The system of claim 1, wherein at least some of the mapping designation information is associated with one or more fixed coordinate areas within the FOV having fixed coordinates in a fixed coordinate system established in space and wherein the active 3D scanner is gimbaled to a platform by a gimbal, and wherein the processing circuitry is further configured to:
   upon identifying a change in a first orientation of the platform relative to the fixed coordinate areas, provide a control signal for rotating the active 3D scanner along the gimbal to maintain a second orientation of the at least one detector relative to the fixed coordinate areas notwithstanding the change in the first orientation of the platform relative to the fixed coordinate areas.

4. The system of claim 1, wherein at least some of the mapping designation information is associated with one or more moving objects within the FOV and wherein the processing circuitry is further configured to:
   upon identifying a change in at least one of a position or an orientation of the at least one detector relative to the moving objects, update the at least some of the mapping designation information based on the change.

5. The system of claim 1, wherein at least some of the mapping designation information is associated with one or more moving objects within the FOV and wherein the active 3D scanner is gimbaled to a platform by a gimbal, and wherein the processing circuitry is further configured to:
   upon identifying a change in a first orientation of the platform relative to the moving objects, provide a control signal for rotating the active 3D scanner along the gimbal to maintain a second orientation of the at least one detector relative to the moving objects notwithstanding the change in the first orientation of the platform relative to the moving objects.

6. The system of claim 1, wherein the active 3D scanner is mounted on an airborne platform, and wherein, during a landing approach for landing the airborne platform at a selected landing area, the part of the FOV is associated with one or more of: the selected landing area or a path to the selected landing area.

7. The system of claim 1, wherein the processing circuitry is further configured to:
   obtain targeting designation information that designates one or more designated targets; and
   activate the at least one energy emitting source to emit one or more targeting energy pulses towards the designated targets.

8. The system of claim 7, wherein the targeting designation information is obtained from a tracker that tracks a line-of-sight between a user of the system and the designated targets.

9. The system of claim 1
   wherein the processing circuitry is further configured to:
      provide a pre-loaded 3D model of a mission area, pre-loaded prior to performing a mission by the moving platform; and
      obtain a current location of the moving platform; and
   wherein at least some of the mapping designation information is determined based on the 3D model, the current location and one or more mapping designation rules.

10. A method for generating a three-dimensional (3D) map of part of a field-of-view (FOV) of at least one detector of an active 3D scanner, the method comprising:
   obtaining mapping designation information, wherein at least some of the mapping designation information is tracker-based designation information that is designated by a user via a tracker that tracks a line-of-sight between the user and the FOV;
   selectively activating at least one energy emitting source of the active 3D scanner to emit a first number of energy pulses, in accordance with the mapping designation information, including the tracker-based designation information, and in synchronization with a scanning mechanism of the active 3D scanner, to cover the part of the FOV, wherein the scanning mechanism is configured to scan the FOV, and wherein the at least one energy emitting source is configured to emit a second number of energy pulses, in synchronization with the scanning mechanism, to cover the FOV, the second number of energy pulses being greater than the first number of energy pulses;

obtaining current readings, from at least one detector of the active 3D scanner, based on reflections of the first number of energy pulses; and generating the 3D map based on the current readings.

11. The method of claim 10, wherein at least some of the mapping designation information is associated with one or more fixed coordinate areas within the FOV having fixed coordinates in a fixed coordinate system established in space, and wherein the method further comprises:

upon identifying a change in at least one of a position or an orientation of the at least one detector relative to the fixed coordinate areas, updating the at least some of the mapping designation information based on the change.

12. The method of claim 10, wherein at least some of the mapping designation information is associated with one or more fixed coordinate areas within the FOV having fixed coordinates in a fixed coordinate system established in space, wherein the active 3D scanner is gimbaled to a platform by a gimbal, and wherein the method further comprises:

upon identifying a change in a first orientation of the platform relative to the fixed coordinate areas, providing a control signal for rotating the active 3D scanner along the gimbal to maintain a second orientation of the at least one detector relative to the fixed coordinate areas notwithstanding the change in the first orientation of the platform relative to the fixed coordinate areas.

13. The method of claim 10, wherein at least some of the mapping designation information is associated with one or more moving objects within the FOV, and wherein the method further comprises:

upon identifying a change in at least one of a position or an orientation of the at least one detector relative to the moving objects, updating the at least some of the mapping designation information based on the change.

14. The method of claim 10, wherein at least some of the mapping designation information is associated with one or more moving objects within the FOV, wherein the active 3D scanner is gimbaled to a platform by a gimbal, and wherein the method further comprises:

upon identifying a change in a first orientation of the platform relative to the moving objects, providing a control signal for rotating the active 3D scanner along the gimbal to maintain a second orientation of the at least one detector relative to the moving objects notwithstanding the change in the first orientation of the platform relative to the moving objects.

15. The method of claim 10, further comprising:

obtaining targeting designation information that designates one or more designated targets; and activating the at least one energy emitting source to emit one or more targeting energy pulses towards the designated targets.

16. The method of claim 15, wherein the targeting designation information is obtained from a tracker that tracks a line-of-sight between a user and the designated targets.

17. The method of claim 10, wherein the active 3D scanner is mounted on a moving platform, wherein the method further comprises:

providing a pre-loaded 3D model of a mission area, pre-loaded prior to performing a mission by the moving platform; and obtaining a current location of the moving platform; and wherein at least some of the mapping designation information is determined based on the 3D model, the current location and one or more mapping designation rules.

18. A non-transitory computer readable storage medium having computer readable program code embodied therewith, the computer readable program code, executable by processing circuitry of a computer to perform a method for generating a three-dimensional (3D) map of part of a field-of-view (FOV) of at least one detector of an active 3D scanner, the method comprising:

obtaining mapping designation information, wherein at least some of the mapping designation information is tracker-based designation information that is designated by a user via a tracker that tracks a line-of-sight between the user and the FOV;

selectively activating at least one energy emitting source of the active 3D scanner to emit a first number of energy pulses, in accordance with the mapping designation information, including the tracker-based designation information, and in synchronization with a scanning mechanism of the active 3D scanner, to cover the part of the FOV, wherein the scanning mechanism is configured to scan the FOV, and wherein the at least one energy emitting source is configured to emit a second number of energy pulses, in synchronization with the scanning mechanism, to cover the FOV, the second number of energy pulses being greater than the first number of energy pulses;

obtaining current readings, from at least one detector of the active 3D scanner, based on reflections of the first number of energy pulses; and generating the 3D map based on the current readings.

19. The system of claim 1, wherein the mapping designation information is independent of past readings obtained by the at least one detector, if any.

20. The method of claim 10, wherein the mapping designation information is independent of past readings obtained by the at least one detector, if any.

* * * * *